United States Patent [19]
Ban et al.

[11] Patent Number: 5,893,342
[45] Date of Patent: Apr. 13, 1999

[54] VISCOUS FLUID TYPE HEAT GENERATOR WITH TEMPERATURE SENSOR INCORPORATED THEREIN

[75] Inventors: Takashi Ban; Shigeru Suzuki; Nobuaki Hoshino; Kiyoshi Yagi, all of Kariya, Japan

[73] Assignee: Kabushiki Kaisha Toyoda Jidoshokki Seisakusho, Kariya, Japan

[21] Appl. No.: 09/062,850

[22] Filed: Apr. 20, 1998

[30] Foreign Application Priority Data

Apr. 22, 1997 [JP] Japan ............... 9-104917

[51] Int. Cl.$^6$ ............................................. F22B 3/06
[52] U.S. Cl. ................................. 122/26; 126/247
[58] Field of Search .................. 122/26; 126/247; 237/12.3 R, 12.3 B

[56] References Cited

FOREIGN PATENT DOCUMENTS

| | | |
|---|---|---|
| A2246823 | 10/1990 | Japan . |
| A2254010 | 10/1990 | Japan . |
| A357877 | 3/1991 | Japan . |
| U398107 | 10/1991 | Japan . |
| U411716 | 1/1992 | Japan . |

*Primary Examiner*—Teresa Walberg
*Assistant Examiner*—Jiping Lu
*Attorney, Agent, or Firm*—Burgess, Ryan & Wayne

[57] ABSTRACT

A viscous fluid type heat generator which comprises a housing assembly defining therein a heat generating chamber in which heat is generated, and a heat receiving chamber arranged adjacent to the heat generating chamber for permitting a heat exchanging fluid to circulate therethrough to receive heat transferred from the heat generating chamber. A drive shaft is rotatably supported by the housing assembly and is operationally connected to an external rotation-drive source. A rotor element is mounted onto and driven by the drive shaft for rotation within the heat generating chamber. A viscous fluid is held in a gap defined between the inner wall surfaces of the heat generating chamber and the outer surfaces of the rotor element, for heat generation under shearing stress applied by the rotating rotor element. A temperature sensor is provided to detect a temperature of a part of the viscous fluid flowing in an outer peripheral region of the gap. Heat generation suppressing means is provided for suppressing the heat generation of the viscous fluid under the shearing stress when the temperature of the part of the viscous fluid, detected by the temperature sensor, exceeds a predetermined limit temperature.

8 Claims, 3 Drawing Sheets

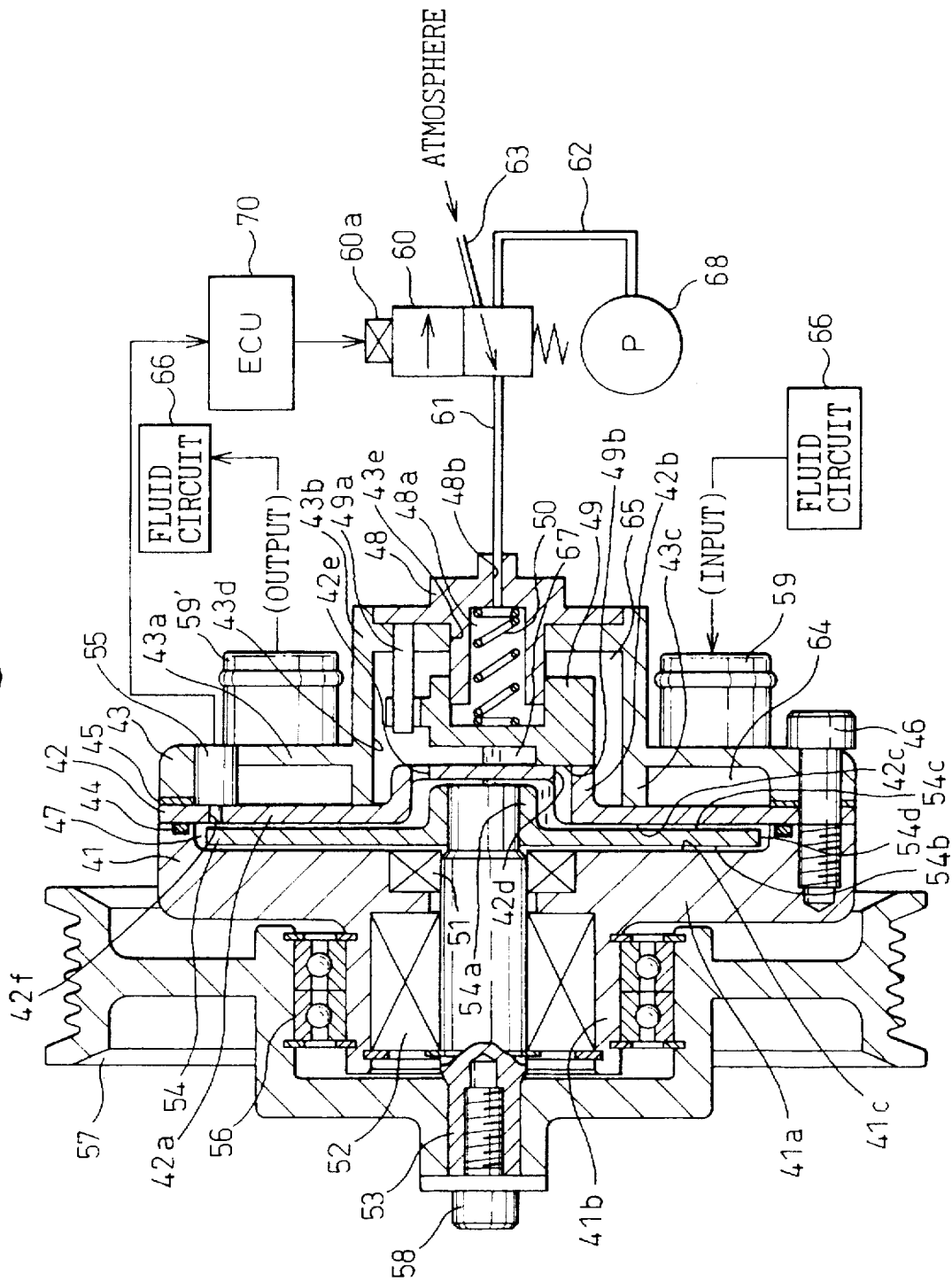

VISCOUS FLUID TYPE HEAT GENERATOR WITH TEMPERATURE SENSOR INCORPORATED THEREIN

BACKGROUND OF THE INVENTION

1. Field of the Invention

The present invention relates to a viscous fluid type heat generator in which a viscous fluid is subjected to a shearing stress in a heat generating chamber to generate heat that is in turn transferred to a heat exchanging fluid circulating through a heat receiving chamber to be carried by the heat exchanging fluid to a desired area to be heated. The present invention may be considered to be a supplementary heat source incorporated in a vehicle heating system.

2. Description of the Related Art

In conventional vehicle heating systems, a cooling water or heat exchanging fluid circulating through a fluid circuit for cooling a water-cooled engine is introduced into a heater core or heat exchanger, an air heated through the heater core is discharged into a passenger compartment of the vehicle to thereby heat the latter. In this respect, a vehicle provided with an engine such as a diesel engine or a lean burn engine, which generally provide a relatively low heating value and thus insufficiently heat the heat exchanging fluid, are unlikely to maintain the temperature of the heat exchanging fluid, to be introduced into the heater core at a desired temperature sufficient to heat the passenger compartment, for example, at 80° C. or more. Consequently, the heating systems incorporated in such vehicles are generally liable to lack heating performance for the passenger compartment.

To overcome the above problem, a viscous fluid type heat generator has been provided to be incorporated as a supplementary heat source, in a fluid circuit, through which a cooling water or heat exchanging fluid circulates for cooling the engine. In the known viscous fluid type heat generator, a housing assembly defines therein a heat generating chamber and a heat receiving chamber arranged adjacent to the heat generating chamber. The heat exchanging fluid circulates to be introduced into the heat receiving chamber and to be delivered therefrom to the fluid circuit.

A drive shaft is supported for rotation by a bearing in the housing assembly, and a rotor element is fixedly mounted on the drive shaft to be rotatable within the heat generating chamber. The rotor element includes outer surfaces arranged face-to-face with the inner wall surfaces of the heat generating chamber to define therebetween a small gap. The viscous fluid, such as silicone oil, is supplied into the heat generating chamber in a fluid-tight manner to fill the small gap.

In the vehicle provided with the above viscous fluid type heat generator incorporated into the fluid circuit, when the output torque of the vehicle engine is transferred to the drive shaft of the heat generator to rotationally drive the drive shaft, the rotor element is also rotated within the heat generating chamber. The rotating rotor element provides a shearing stress to the viscous fluid held in the small gap between the inner wall surfaces of the heat generating chamber and the outer surfaces of the rotor element, whereby the viscous fluid generates heat. The generated heat is then transferred from the viscous fluid to the heat exchanging fluid circulating through the heat receiving chamber, and the heat exchanging fluid carries the transferred heat to the fluid circuit of the vehicle heating system to heat the passenger compartment.

In the above-mentioned conventional viscous fluid type heat generator incorporated into the fluid circuit of the cooling water or heat exchanging fluid for cooling the engine, the temperature of the viscous fluid in the heat generating chamber rises when the rotation speed of the engine is increased, regardless of the temperature of the heat exchanging fluid circulating through the fluid circuit. Consequently, when the engine operates at such a high speed that the temperature of the viscous fluid in the heat generating chamber rises and exceeds a limit temperature defining the heat resistant properties of the viscous fluid, the quality of the viscous fluid is apt to be thermally and mechanically deteriorated.

For example, when a silicone oil with high viscosity is used as the viscous fluid, the quality of the silicone oil will be thermally and mechanically deteriorated when the temperature thereof exceeds about 250° C. The deterioration of the viscous fluid reduces the efficiency of heat generation due to the shearing stress applied thereto, which results in the reduction of a heating performance, accomplished by the conventional viscous fluid type heat generator, required to comfortably heat, e.g., the vehicle passenger compartment.

SUMMARY OF THE INVENTION

Therefore, an object of the present invention is to provide a viscous fluid type heat generator which can prevent the deterioration of the viscous fluid in the heat generating chamber due to the extremely high temperature rise of the viscous fluid, and thus can maintain a comfortable heating performance of a vehicle heating system.

In accordance with the present invention, there is provided a viscous fluid type heat generator comprising a housing assembly defining therein a heat generating chamber in which heat is generated, the heat generating chamber having inner wall surfaces thereof, and a heat receiving chamber arranged adjacent to the heat generating chamber, the heat receiving chamber permitting a heat exchanging fluid to circulate through the heat receiving chamber to thereby receive heat transferred from the heat generating chamber; a drive shaft supported by the housing assembly to be rotatable about an axis of rotation of the drive shaft, the drive shaft being operationally connected.So an external drive source; a rotor element mounted on and driven by the drive shaft for rotation within the heat generating chamber, the rotor element having outer surfaces confronting the inner wall surfaces of the heat generating chamber via a predetermined gap defined therebetween; a viscous fluid, held in the gap defined between the inner wall surfaces of the heat generating chamber and the outer surfaces of the rotor element, for heat generation under shearing stress applied by the rotation of the rotor element; a temperature sensor provided in the housing assembly to detect a temperature of a part of the viscous fluid flowing in an outer peripheral region of the gap; and heat generation suppressing means for suppressing the heat generation of the viscous fluid under the shearing stress when the temperature of the part of the viscous fluid, detected by the temperature sensor, exceeds a predetermined limit temperature.

In this viscous fluid type heat generator, it is preferred that the temperature sensor is located in the inner wall surfaces of the heat generating chamber and opposite to an outer peripheral area of the outer surfaces of the rotor element.

In this arrangement, the rotor element may have a generally circular shape, and the outer peripheral area may be defined, in the outer surfaces of the rotor element, radially outside of a concentric circle line having a generally half radius of the rotor element.

It is also advantageous that the heat generation suppressing means comprises a clutch device arranged to establish a power transmission from the external drive source to the drive shaft, the clutch device cutting off the power transmission when the detected temperature exceeds the predetermined limit temperature.

In this arrangement, the clutch device may be an electromagnetic clutch device.

It is further advantageous that the housing assembly further defines therein an additional chamber fluidly communicated with the heat generating chamber for circulation of the viscous fluid between the additional chamber and the heat generating chamber, and that the heat generation suppressing means comprises the additional chamber and a valve mechanism arranged to shut off the circulation of the viscous fluid to thereby gradually reduce an amount of the viscous fluid in the heat generating chamber when the detected temperature exceeds the predetermined limit temperature.

The valve mechanism may include a valve member disposed in the additional chamber to be shiftable for shutting off of the circulation, and a control arrangement for controllably shifting the valve member while monitoring whether the detected temperature exceeds the predetermined limit temperature or not.

Also, the additional chamber may be separated from the heat generating chamber by a partition wall through which a fluid supply passageway and a fluid withdrawing passageway penetrate, the fluid supply and fluid withdrawing passageways permitting the circulation of the viscous fluid, and the valve mechanism may be arranged to close the fluid supply passageway.

BRIEF DESCRIPTION OF THE DRAWINGS

The above and other objects, features and advantages of the present invention will become more apparent from the following description of preferred embodiments in connection with the accompanying drawings, in which:

FIG. 4 is a longitudinal sectional view of a second embodiment of a viscous fluid type heat generator according to the present invention.

DESCRIPTION OF THE PREFERRED EMBODIMENTS

Figure 1:
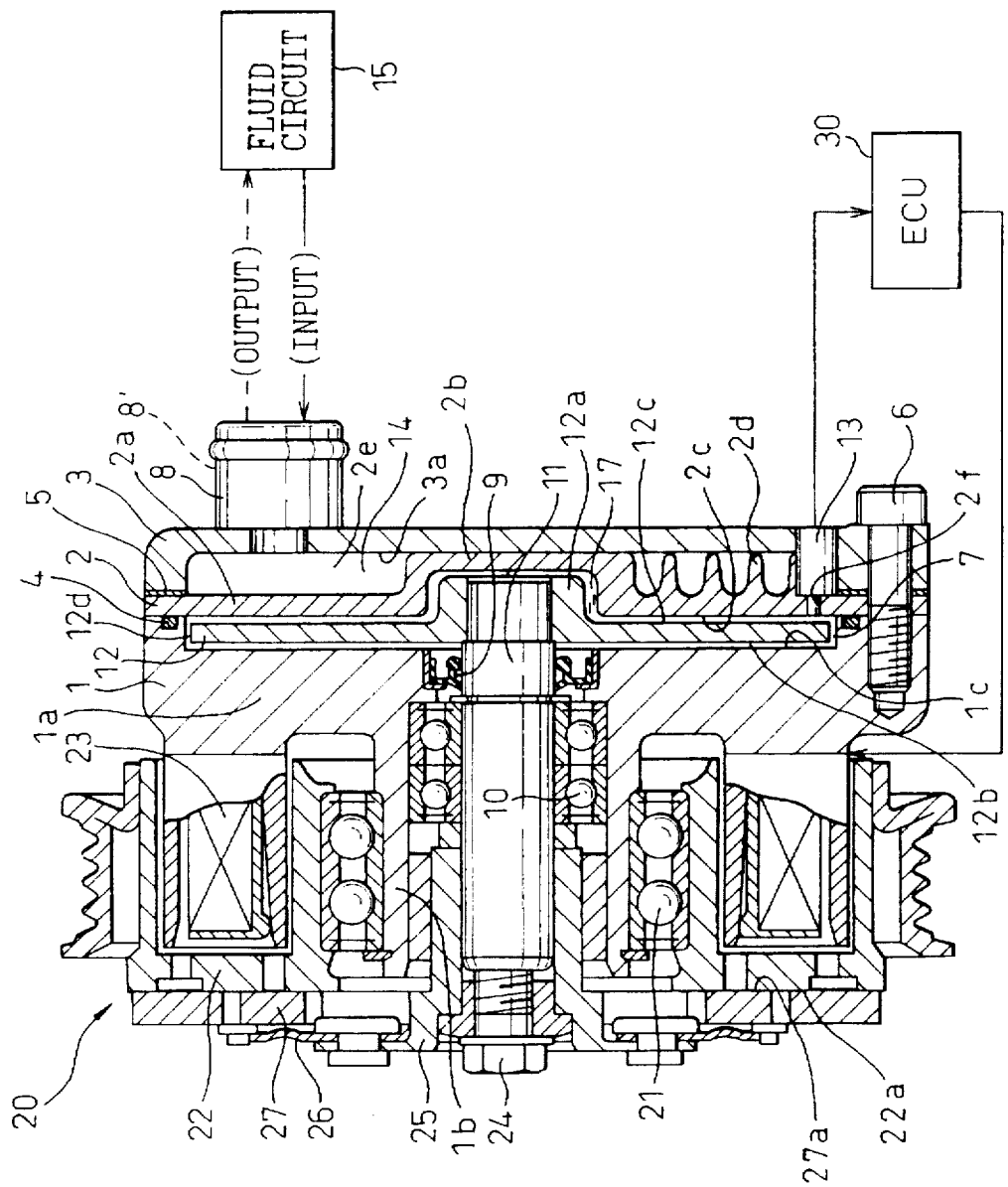
FIG. 1 is a longitudinal sectional view of a first embodiment of a viscous fluid type heat generator according to the present invention.

Referring now to the drawings, wherein the same or similar components are denoted by the same reference numerals, FIG. 1 shows the first embodiment of a viscous fluid type heat generator according to the present invention.

The heat generator of FIG. 1 includes a front housing body 1, a partition plate 2 and a rear housing body 3, which are assembled to form a housing assembly of the heat generator of the present invention. The front housing body 1, the partition plate 2 and the rear housing body 3 are axially stacked with one another, and are tightly combined therewith by a plurality of screw bolts 6, through the interpositions of an O-ring 4 hermetically sealing between the outer peripheral areas of front housing body 1 and partition plate 2, as well as of a gasket 5 hermetically sealing between the outer peripheral areas of partition plate 2 and rear housing body 3.

The front housing body 1 includes an annular base wall section 1a and a hollow, cylindrical center boss 1b axially frontwardly (leftwardly, in the figure) and integrally extending from the base wall section 1a, to define a center through bore axially penetrating the base wall section 1a and the center boss 1b. The partition plate 2 includes a radially outer annular part 2a and a center cup-shaped part 2b axially rearwardly (rightwardly, in the figure) and integrally extending from a radially inner extremity of the annular part 2a.

A rear end face of the base wall section 1a of the front housing body 1 is provided with an annular recess formed therein. An annular rear surface 1c and a cylindrical circumferential surface of the annular recess formed in the front housing body 1 cooperate with a front surface 2c of the partition plate 2 to define a heat generating chamber 7 having a generally cylindrical shape, into which a viscous fluid 17, such as a silicone oil, is accommodated. Thus, the annular rear surface 1c and the cylindrical circumferential surface of the annular recess of the front housing body 1 as well as the front surface 2c of the partition plate 2 are structured as the inner wall surfaces of the heat generating chamber 7.

The partition plate 2 is also provided on a rear surface thereof with four C-shaped ridges 2d which axially rearwardly and integrally project from the rear surface and are arranged concentrically on the annular part 2a around the center cup-shaped part 2b. Between circumferential opposed ends of each C-shaped ridge 2d, a division wall 2e axially rearwardly and integrally projecting from the rear surface and radially outwardly extending from the center part 2b is provided.

The center cup-shaped part 2b and the division wall 2e of the partition plate 2 are abutted to the front face 3a of the cup-shaped rear housing body 3. The rear surface of the partition plate 2, involving the surfaces of center part 2b, C-shaped ridges 2d and division wall 2e, cooperates with the front surface 3c of the rear housing body 3, to define a generally C-shaped heat receiving chamber 14 arranged adjacent to the rear side of the heat generating chamber 7, into which a heat exchanging fluid is introduced. The heat receiving chamber 14 is separated in a fluid-tight manner from the heat generating chamber 7 and from the ambient atmosphere by the partition plate 2 interposed therebetween and the gasket 5.

An inlet port 8 and an outlet port 8' are provided side-by-side on the rear housing body 3 to open to the heat receiving chamber 14 at respective positions adjacent to the opposite sides of the division wall 2e. Thus, the heat exchanging fluid or a cooling water for cooling a water-cooled engine of a vehicle (not shown), circulating through a fluid circuit 15 of a vehicle heating system (not shown), is introduced or input through the inlet port 8 into the heat receiving chamber 14, and is discharged or output from the heat receiving chamber 14 through the outlet port 8' into the fluid circuit 15.

A drive shaft 11, typically positioned in a substantially horizontal state, is rotatably supported by a pair of bearings 10 located inside the center boss 1b of the front housing body 1. An axial rear end of the drive shaft 11 reaches to the heat generating chamber 7. A shaft sealing device 9 is disposed at the rear side of the bearings 10 in the center through bore of the front housing body 1 to surround the drive shaft 11, whereby the heat generating chamber 7 is sealed in a fluid-tight manner from the exterior of the heat generator.

A rotor element 12, in the shape of a flat circular disc with a center boss 12a, is mounted and tightly press-fitted on the rear axial end of the drive shaft 11. The rotor element 12 is arranged within the heat generating chamber 7 in such a manner as to be rotatable by the drive shaft 11 about the generally horizontal rotation axis thereof. The rotor element 12 has axially opposed front and rear circular surfaces 12b, 12c, and an outer circumferential surface 12d, which are structured as the outer surfaces of the rotor element in the present invention. The outer surfaces of the rotor element 12 do not come into contact with the inner wall surfaces of the heat generating chamber 7 at any time, and thus define therebetween a relatively small gap for holding the viscous fluid 17 such as silicone oil.

A temperature sensor 13, such as a thermistor, is mounted on the outer peripheral area of the rear housing body 3 to come into contact with the viscous fluid 17 held in the small gap through an aperture 2f formed in the outer peripheral area of the partition plate 2. That is, the temperature sensor 13 is positioned, in the front surface 2c of the partition plate 2, i.e., the inner wall surface of the heat generating chamber 7, opposite to an outer peripheral area of the rear surface 12c of the rotor element 12. The temperature sensor 13 detects a temperature of a part of the viscous fluid 17 flowing in an outer peripheral region of the small gap in the heat generating chamber 7 during the rotation of the rotor element 12 therein.

The temperature sensor 13 is connected to an electrical control unit (ECU) 30 of a vehicle air-conditioning system (not shown) to transmit an electrical signal for the detected temperature of the viscous fluid 17 to the ECU 30. The ECU 30 is also connected with the certain components of the vehicle air-conditioning system as well as another electrical control unit of a vehicle engine (not shown) to process various data communicated therebetween.

The drive shaft 11 is connected through an electromagnetic clutch device 20 as a power transmission, disposed around the center boss 1b of the front housing body 1, with the output of the vehicle engine. The electromagnetic clutch device 20 includes a pulley 22 supported for rotation by a bearing 21 on the center boss 1b, a solenoid coil 23 fixedly supported on the base wall section 1a of the front housing body 1 so as to project frontward and to be arranged in an annular recess formed in the rear side of the pulley 22, a hub 25 fixedly mounted on the front end of the drive shaft 11 by a bolt 24 for rotation together with the drive shaft 11, and an annular armature 27 axially shiftably supported around the hub 25 by an annular elastic member 26 for rotation together with the hub 25.

The elastic member 26 is fixed at the radially center region thereof to the rear side of the flange section of the hub 25, and at the outer peripheral region thereof to the armature 27 by, e.g., rivets. The operating surface 27a of the armature 27 confronts the front surface 22a of the pulley 22, which forms a counterpart operating surface of the clutch device 20.

The pulley 22 is operatively connected by a belt (not shown) to the vehicle engine to be rotationally driven by the engine. The solenoid coil 23 is also connected to the ECU 30. The coil 23 is energized under the instruction of the ECU 30, and exerts an electromagnetic attracting force through the pulley 22 on the armature 27 to bring the operating surface 27a of the armature 27 into frictional engagement with the front surface 22a of the pulley 22 against the frontward biasing force of the elastic member 26.

In the viscous fluid type heat generator thus constructed, when the vehicle engine operates, the output torque of the engine is transmitted through the belt to the pulley 22 of the electromagnetic clutch device 20. If the solenoid coil 23 of the electromagnetic clutch device 20 is energized under the instruction of the ECU 30 during the time that the pulley 22 is driven for rotation, the armature 27 is attracted toward the pulley 22 and the operating surfaces 27a and 22a thereof are frictionally engaged with each other, against the biasing force of the elastic member 26, by the electromagnetic force of the solenoid coil 23. The rotation or torque of the pulley 22 is then transmitted through the armature 27, elastic member 26 and hub 25 to the drive shaft 11.

In this manner, the rotor element 12 is rotated in the heat generating chamber 7 through the drive shaft 11 and the electromagnetic clutch device 20 by the output of the vehicle engine. The rotating rotor element 12 applies a shearing stress to the viscous fluid 17 such as silicon oil held in the small gap between the inner wall surfaces of the heat generating chamber 7 and the outer surfaces of the rotor element 12, whereby the viscous fluid 17 generates heat. The heat thus generated is transferred to the heat exchanging fluid flowing through the heat receiving chamber 14, and is carried by the heat exchanging fluid circulating through the fluid circuit 15, including a heater core (not shown), of the vehicle heating system to heat, e.g., the passenger compartment.

During the above heat-generating operation of the heat generator of the first embodiment, the temperature sensor 13 detects a temperature of a part of the viscous fluid 17 flowing in the outer peripheral region of the small gap in the heat generating chamber 7, and transmits a data signal for the detected temperature of the viscous fluid 17 to the ECU 30, as discussed above. The ECU 30 then processes the data signal transmitted from the temperature sensor 13, and decides whether the detected temperature is higher than a stored, predetermined limit temperature. In this respect, the limit temperature is determined on the basis of the heat resisting properties of the viscous fluid 17 such as silicone oil, so that, if the detected temperature exceeds the limit temperature, it will become difficult to maintain the heat generating performance of the viscous fluid 17 at a preferred level.

If the temperature of the part of the viscous fluid 17, flowing in the outer peripheral region of the small gap, becomes higher than the limit temperature, the ECU 30 commands to deenergize the solenoid coil 23 of the electromagnetic clutch device 20. Thereby, the armature 27 is disengaged from the pulley 22 due to the biasing force of the elastic member 26, and the power transmission from the vehicle engine to the drive shaft 11 is cut off. Consequently, the rotor element 12 applies no shearing stress to the viscous fluid 17 held in the small gap, so that the heat generation of the viscous fluid 17 under the shearing stress is suppressed. In this manner, the thermal and mechanical deterioration of the viscous fluid 17 due to an extremely high temperature rise thereof can be effectively prevented.

If the temperature of the part of the viscous fluid 17, flowing in the outer peripheral region of the small gap, becomes lower than the limit temperature, the ECU 30 commands to energize the solenoid coil 23 of the electromagnetic clutch device 20. Therefore, the armature 27 is engaged with the pulley 22 due to the electromagnetic force of the solenoid coil 23, and the power is transmitted from the vehicle engine to the drive shaft 11. Consequently, the rotor element 12 applies a shearing stress to the viscous fluid 17 held in the small gap, so that the viscous fluid 17 generates heat which is carried by the heat exchanging fluid circulating through the fluid circuit 15 to heat, e.g., the passenger compartment.

As will be understood from the above, the heat generator of the first embodiment can prevent the thermal and mechanical deterioration of the viscous fluid 17 due to the extremely high temperature rise thereof, and therefore, can maintain a comfortable heating performance of the vehicle heating system while keeping the high efficiency of heat generation due to the shearing stress applied to the viscous fluid 17. Also, the load on the vehicle engine is reduced during the suppression of the heat generation of the generator, which can improve the driving performance of the vehicle on the point of, e.g., exhaust gas or fuel consumption.

Figure 2:
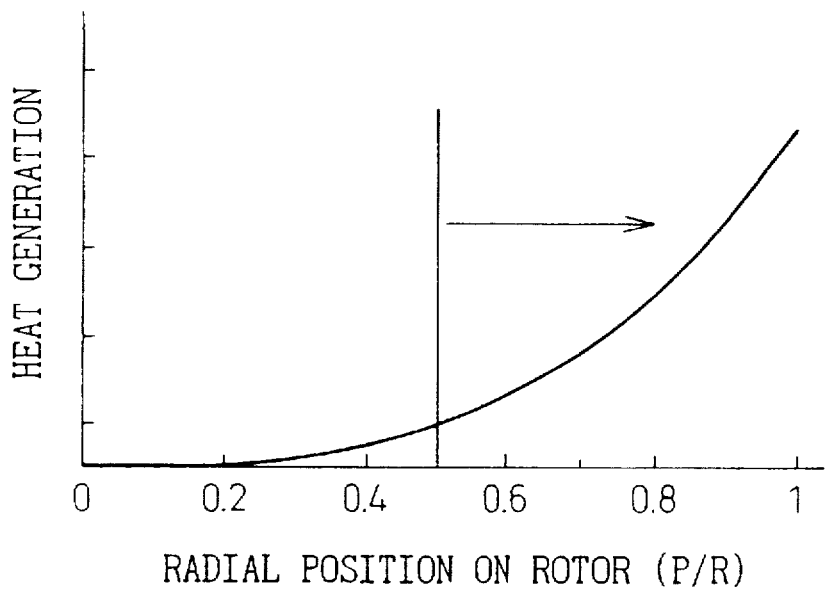
FIG. 2 graphically shows a relationship between radial positions on a rotor element and heat generation values thereon, in the first embodiment of the viscous fluid type heat generator.

FIG. 2 graphically shows a relationship between the radial positions indicated on the rear surface 12c of the rotor element 12 and the heat generation values of the viscous fluid 17 detected on those radial positions, in the first embodiment of the viscous fluid type heat generator. Each radial position (P/R) is represented by dividing a radial distance (P) from the rotation axis of the rotor element 12 to a detecting point of the temperature sensor 13 located opposite to the rear surface 12c of the rotor element 12 by a radius (R) of the rotor element 12.

As clearly shown in FIG. 2, the heat generation value of the viscous fluid 17 is increased at a larger rate when the detecting point is shifted further into the outer peripheral area of the rear surface 12c of the rotor element 12. In this respect, the outer peripheral area may be defined, in the outer surfaces of the rotor element 12, radially outside of a concentric circle line having a generally half radius (i.e., 0.5R) of the rotor element 12.

Figure 3:
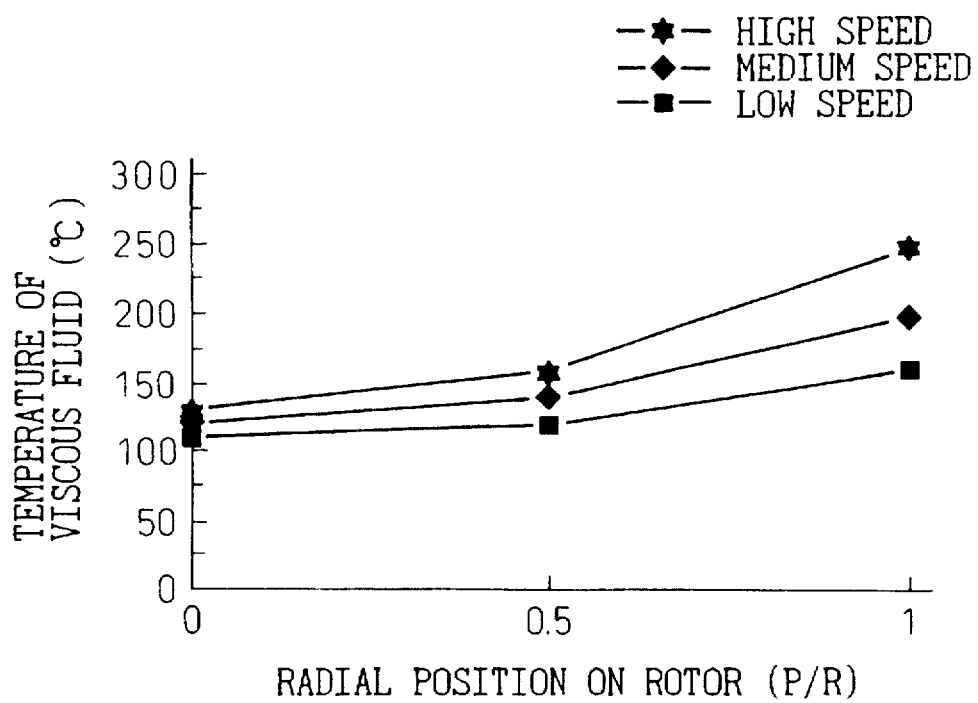
FIG. 3 graphically shows a relationship between rotation speeds of a rotor element, radial positions on the rotor element and temperatures of a viscous fluid, in the first embodiment of the viscous fluid type heat generator.

FIG. 3 graphically shows a relationship between the rotation speeds of the rotor element 12, the radial positions (P/R) indicated on the rotor element 12 in the same manner as FIG. 2, and the temperatures (°C.) of the viscous fluid 17 detected on those radial positions, in the first embodiment of the viscous fluid type heat generator. The rotation speeds of the rotor element 12 are represented by high, medium and low speeds. As clearly shown in FIG. 3, the temperature of the viscous fluid 17 rises when the detecting point is shifted further into the outer peripheral area of the rear surface 12c of the rotor element 12, and this temperature rise becomes more significant when the rotation speed of the rotor element 12 is increased.

As will be understood from FIGS. 2 and 3, it is appropriate to locate the temperature sensor 13 at a position opposite to the outer peripheral surface area of the rotor element 12 in the inner wall surfaces of the heat generating chamber 7, because the temperature sensor 13 is thereby permitted to detect the higher or highest temperature of the part of the viscous fluid 17 flowing in the outer peripheral region of the small gap. Therefore, in such an appropriate location, the extremely high temperature rise of the viscous fluid 17 can be more effectively prevented.

FIG. 4 shows the second embodiment of a viscous fluid type heat generator according to the present invention.

The heat generator of FIG. 4 includes a front housing body 41, a partition plate 42 and a rear housing body 43, which are assembled to form a housing assembly of the heat generator of the present invention. The front housing body 41, the partition plate 42 and the rear housing body 43 are axially stacked with one another, and are tightly combined therewith by a plurality of screw bolts 46, through the interpositions of an O-ring 44 hermetically sealing between the outer peripheral areas of front housing body 41 and partition plate 42, as well as of a gasket 45 hermetically sealing between the outer peripheral areas of partition plate 42 and rear housing body 43.

The front housing body 41 includes an annular base wall section 41a and a hollow, cylindrical center boss 41b axially frontwardly (leftwardly, in the figure) and integrally extending from the base wall section 41a, to define a center through bore axially penetrating the base wall section 41a and the center boss 41b. The partition plate 42 includes a radially outer annular part 42a and a center cup-shaped part 42b axially rearwardly (rightwardly, in the figure) and integrally extending from a radially inner extremity of the annular part 42a.

A rear end face of the base wall section 41a of the front housing body 41 is provided with an annular recess formed therein. An annular rear surface 41c and a cylindrical circumferential surface of the annular recess formed in the front housing body 41 cooperate with a front surface 42c of the partition plate 42 to define a heat generating chamber 47 having a generally cylindrical shape, into which a viscous fluid 67, such as a silicone oil, is accommodated. Thus, the annular rear surface 41c and the cylindrical circumferential surface of the annular recess of the front housing body 41 as well as the front surface 42c of the partition plate 42 are structured as the inner wall surfaces of the heat generating chamber 47.

The rear housing body 43 includes a radially outer annular part 43a and a center cup-shaped part 43b axially rearwardly (rightwardly, in the figure) and integrally extending from a radially inner extremity of the annular part 43a. A front face of the annular part 43a of the rear housing body 43 is provided with an annular recess separated from a center recess defined in the center part 43b through a cylindrical wall 43c axially frontwardly and integrally extending from the radially inner extremity of the annular part 43a.

When assembling the housing assembly, the front edge of the cylindrical wall 43c is tightly abutted onto the rear surface of the annular part 42a of the partition plate 42, to define a C-shaped heat receiving chamber 64 arranged near the rear side of the heat generating chamber 47, into which the heat exchanging fluid is introduced. The heat receiving chamber 64 is separated in a fluid-tight manner from the heat generating chamber 47 and from the ambient atmosphere by the partition plate 42 interposed therebetween and the gasket 45.

The inner wall surfaces 43d of center part 43b and cylindrical wall 43c of the rear housing body 43 also cooperate with the rear surface of partition plate 42 involving the surface of center part 42b, to define a fluid storing chamber 65 arranged near the rear side of the heat generating chamber 47. The fluid storing chamber 65 is separated in a fluid-tight manner from the heat receiving chamber 64 by the cylindrical wall 43c.

The partition plate 42 is provided in the center part 42b thereof with a fluid supply passageway 42d and a fluid withdrawing passageway 42e, which fluidly communicate the heat generating chamber 47 with the fluid storing chamber 65. The fluid supply passageway 42d opens to the lower region of the heat generating chamber 47, and serves to supply the viscous fluid 67 stored in the fluid storing chamber 65 to the heat generating chamber 47. The fluid withdrawing passageway 42e opens to the upper region of the heat generating chamber 47, and serves to withdraw the viscous fluid 67 held in the small gap in the heat generating chamber 47 to the fluid storing chamber 65.

The center part 43b of the rear housing body 43 is provided in the rear end wall thereof with a center through hole 43e. A closure member 48 is tightly and fixedly fitted into the center through hole 43e of the center part 43b to close the through hole 43e. The closure member 48 includes a sleeve section extending into the fluid storing chamber 65, for slidably supporting a valve member 49 thereon. The valve member 49 is fitted onto the sleeve section of the closure member 48 so as to be shiftable in the axial direction of the sleeve section, and is inhibited from rotation in the fluid storing chamber 65 by a guide pin 49a secured to the center part 43b of the rear housing body 43.

The closure member 48 defines in the sleeve section a receptacle 48a for receiving a spring 50, such as a compression spring. The spring 50 is disposed between the closure member 48 and the valve member 49 to axially frontwardly bias the valve member 49 toward the partition plate 42. The valve member 49 is provided on the front end thereof a valve face 49b which can be abutted against the rear end face of the center part 42b of the partition plate 42 to close the fluid supply passageway 42d formed therein under the biasing force of the spring 50. The closure member 48 also includes a vent hole 48b formed therein to communicate the receptacle 48a with a control valve 60 through a channel 61.

An inlet port 59 and an outlet port 59' are provided on the rear side of the rear housing body 43 at the radially opposed positions to open to the heat receiving chamber 64. Thus, the heat exchanging fluid or a cooling water for cooling a water-cooled engine of a vehicle (not shown), circulating through a fluid circuit 66 of a vehicle heating system (not shown), is introduced or input through the inlet port 59 into the heat receiving chamber 64, and is discharged or output from the heat receiving chamber 64 through the outlet port 59' into the fluid circuit 66.

A drive shaft 53, typically positioned in a substantially horizontal state, is rotatably supported by a bearing 52 located inside the center boss 41b of the front housing body 41. An axial rear end of the drive shaft 53 reaches to the heat generating chamber 47. A shaft sealing device 51 is disposed at the rear side of the bearing 52 in the center through bore of the front housing body 41 to surround the drive shaft 53, whereby the heat generating chamber 47 is sealed in a fluid-tight manner from the exterior of the heat generator.

A rotor element 54, in the shape of a flat circular disc with a center boss 54a, is mounted and tightly press-fitted on the rear axial end of the drive shaft 53. The rotor element 54 is arranged within the heat generating chamber 47 in such a manner as to be rotatable by the drive shaft 53 about the generally horizontal rotation axis thereof. The rotor element 54 has axially opposed front and rear circular surfaces 54b, 54c, and an outer circumferential surface 54d, which are structured as the outer surfaces of the rotor element in the present invention. The outer surfaces of the rotor element 54 do not come into contact with the inner wall surfaces of the heat generating chamber 47 at any time, and thus define therebetween a relatively small gap for holding the viscous fluid 67 such as silicone oil.

The drive shaft 53 is connected through a pulley 57 and a belt (not shown) as a power transmission device, disposed around the center boss 41b of the front housing body 41, with the output of the vehicle engine. The pulley 57 is supported for rotation by a bearing 56 on the center boss 41b, and is fixedly mounted on the front end of the drive shaft 53 by a bolt 58 for rotation together with the drive shaft 53.

A temperature sensor 55, such as a thermistor, is mounted onto the outer peripheral area of the rear housing body 43 to come into contact with the viscous fluid 67 held in the small gap through an aperture 42f formed in the outer peripheral area of the partition plate 42. That is, the temperature sensor 55 is positioned, in the front surface 42c of the partition plate 42, i.e., the inner wall surface of the heat generating chamber 47, opposite to an outer peripheral area of the rear surface 54c of the rotor element 54. The temperature sensor 55 detects a temperature of a part of the viscous fluid 67 flowing in an outer peripheral region of the small gap in the heat generating chamber 47 during the rotation of the rotor element 53 therein.

The temperature sensor 55 is connected to an electrical control unit (ECU) 70 of a vehicle air-conditioning system (not shown) to transmit an electrical signal for the detected temperature of the viscous fluid 67 to the ECU 70. The ECU 70 is also connected with certain components of the vehicle air-conditioning system as well as another electrical control unit of a vehicle engine (not shown) to process various data communicated therebetween.

The ECU 70 is further connected with an exciting coil 60a of the control valve 60. The control valve 60 is driven by the exciting coil 60a to switch or establish a fluidic communication between the channel 61 and the selected one of a suction channel 62 of a pump 68 and a ventilation channel 63 opening to the atmosphere, under the instruction of the ECU 70 for energizing or deenergizing the exciting coil 60a.

In the viscous fluid type heat generator thus constructed, when the vehicle engine operates, the output torque of the engine is transmitted through the belt and the pulley 57 to the drive shaft 53. The rotor element 54 is thus rotated in the heat generating chamber 47, and applies a shearing stress to the viscous fluid 67 such as silicon oil held in the small gap between the inner wall surfaces of the heat generating chamber 47 and the outer surfaces of the rotor element 54, thereby the viscous fluid 67 generates heat. The heat thus generated is transferred to the heat exchanging fluid flowing through the heat receiving chamber 64, and is carried by the heat exchanging fluid circulating through the fluid circuit 66, including a heater core (not shown), of the vehicle heating system to heat, e.g., the passenger compartment.

During the above heat-generating operation of the heat generator of the second embodiment, the temperature sensor 55 detects a temperature of a part of the viscous fluid 67 flowing in the outer peripheral region of the small gap in the heat generating chamber 47, and transmit a data signal for the detected temperature of the viscous fluid 67 to the ECU 70, as discussed above. The ECU 70 then processes the data signal transmitted from the temperature sensor 55, and decides whether the detected temperature is higher than a stored, predetermined limit temperature. The limit temperature is determined on the basis of the heat resisting properties of the viscous fluid 67 such as silicone oil, so that, if the detected temperature exceeds the limit temperature, it will become difficult to maintain the heat generating performance of the viscous fluid 67 in a preferred level.

If the temperature of the part of the viscous fluid 67, flowing in the outer peripheral region of the small gap, becomes higher than the limit temperature, the ECU 70 commands the deenergizing of the exciting coil 60a of the control valve 60. Thereby, the control valve 60 establishes a fluidic communication between the channel 61 and the ventilation channel 63 opening to the atmosphere. The receptacle 48a in the closure member 48 is thus provided with an atmospheric pressure, so that the valve member 49 is abutted at the valve face 49b thereof onto the rear end face of the center part 42b of the partition plate 42 to close the fluid supply passageway 42d formed therein under the biasing force of the spring 50.

Consequently, during the rotation of the rotor element 54, the viscous fluid 67 flowing in the small gap in the heat generating chamber 47 is gradually withdrawn from the heat generating chamber 47 through the fluid withdrawing passageway 42e to the fluid storing chamber 65, with no supplement of the viscous fluid 67 from the fluid storing chamber 65. Thereby, the amount of the viscous fluid 67 in the heat generating chamber 47, which should be applied with a shearing stress by the rotating rotor element 54, is gradually reduced, so that the heat generation of the viscous fluid 67 under the shearing stress is attenuated or substantially suppressed. In this manner, the thermal and mechanical deterioration of the viscous fluid 67 due to the extremely high temperature rise thereof can be effectively prevented.

If the temperature of the part of the viscous fluid 67, flowing in the outer peripheral region of the small gap, becomes lower than the limit temperature, the ECU 70 commands the energizing of the exciting coil 60a of the control valve 60. Thereby, the control valve 60 establishes a fluidic communication between the channel 61 and the suction channel 62 of the pump 68. The receptacle 48a in the closure member 48 is thus provided with a negative pressure, so that the valve face 49b of the valve member 49 is disengaged from the rear end face of the center part 42b of the partition plate 42 to open the fluid supply passageway 42d formed therein against the biasing force of the spring 50.

Consequently, during the rotation of the rotor element 54, the viscous fluid 67 flowing in the small gap in the heat generating chamber 47 is withdrawn from the heat generating chamber 47 through the fluid withdrawing passageway 42e to the fluid storing chamber 65, and the viscous fluid 67 stored in the fluid storing chamber 65 is simultaneously supplied through the fluid supply passageway 42d to the heat generating chamber 47. Thereby, the viscous fluid 67 is circulated or continuously changed between the heat generating chamber 47 and the fluid storing chamber 65, and the viscous fluid 67, applied with a shearing stress by the rotating rotor element 54 in the heat generating chamber 47, generates heat for heating, e.g., the passenger compartment of the vehicle.

As will be understood from the above, the heat generator of the second embodiment can prevent the thermal and mechanical deterioration of the viscous fluid 67 due to an extremely high temperature rise thereof, and therefore, can maintain a comfortable heating performance of the vehicle heating system while keeping the high efficiency of heat generation due to the shearing stress applied to the viscous fluid 67.

While the invention has been particularly shown and described with reference to preferred embodiments thereof, it will be understood by those skilled in the art that various changes and modifications may be made without departing from the spirit and scope of the invention. For example, the heat generation suppressing means, embodied in the illustrated embodiments as electromagnetic clutch device 20, control valve 60, and so on, may be replaced with a mechanism for varying the dimension of the small gap between the inner wall surfaces of the heat generating chamber and the outer surfaces of the rotor element. Further, the viscous fluid may be structured as an electrorheological fluid. In this case, the electric current passed through the electrorheological fluid would be controlled on the basis of the temperature thereof detected by the temperature sensor, to vary the fluidic properties of the electrorheological fluid which should be applied with a shearing stress to generate heat. In any event, the scope of the invention should be determined solely by the appended claims.

We claim:

1. A viscous fluid type heat generator comprising:

a housing assembly defining therein a heat generating chamber in which heat is generated, said heat generating chamber having inner wall surfaces thereof, and a heat receiving chamber arranged adjacent to said heat generating chamber, said heat receiving chamber permitting a heat exchanging fluid to circulate through said heat receiving chamber to thereby receive heat transferred from said heat generating chamber;

a drive shaft supported by said housing assembly to be rotatable about an axis of rotation of said drive shaft, said drive shaft being operationally connected to an external drive source;

a rotor element mounted onto and driven by said drive shaft for rotation within said heat generating chamber, said rotor element having outer surfaces confronting said inner wall surfaces of said heat generating chamber via a predetermined gap defined therebetween;

a viscous fluid, held in said gap defined between said inner wall surfaces of said heat generating chamber and said outer surfaces of said rotor element, for heat generation under shearing stress applied by the rotation of said rotor element;

a temperature sensor provided in said housing assembly to detect a temperature of a part of said viscous fluid flowing in an outer peripheral region of said gap; and heat generation suppressing means for suppressing the heat generation of said viscous fluid under the shearing stress when the temperature of said part of said viscous fluid, detected by said temperature sensor, exceeds a predetermined limit temperature.

2. The viscous fluid type heat generator of claim 1, wherein said temperature sensor is located, in said inner wall surfaces of said heat generating chamber, opposite to an outer peripheral area of said outer surfaces of said rotor element.

3. The viscous fluid type heat generator of claim 2, wherein said rotor element has a generally circular shape, and wherein said outer peripheral area is defined, in said outer surfaces of said rotor element, radially outside of a concentric circle line having a generally half radius of said rotor element.

4. The viscous fluid type heat generator of claim 1, wherein said heat generation suppressing means comprises a clutch device arranged to establish a power transmission from said external drive source to said drive shaft, said clutch device cutting off said power transmission when said detected temperature exceeds said predetermined limit temperature.

5. The viscous fluid type heat generator of claim 4, wherein said clutch device is an electromagnetic clutch device.

6. The viscous fluid type heat generator of claim 1, wherein said housing assembly further defines therein an additional chamber fluidly communicated with said heat generating chamber for circulation of said viscous fluid between said additional chamber and said heat generating chamber, and wherein said heat generation suppressing means comprises said additional chamber and a valve mechanism arranged to shut off said circulation of said viscous fluid to thereby gradually reduce an amount of said viscous fluid in said heat generating chamber when said detected temperature exceeds said predetermined limit temperature.

7. The viscous fluid type heat generator of claim 6, wherein said valve mechanism includes a valve member disposed in said additional chamber to be shiftable for shutting off of said circulation, and a control arrangement for controllably shifting said valve member while monitoring whether said detected temperature exceeds said predetermined limit temperature or not.

8. The viscous fluid type heat generator of claim 6, wherein said additional chamber is separated from said heat generating chamber by a partition wall through which a fluid supply passageway and a fluid withdrawing passageway penetrate, said fluid supply and fluid withdrawing passageways permitting said circulation of said viscous fluid, and wherein said valve mechanism is arranged to close said fluid supply passageway.

* * * * *